US009700070B2

(12) United States Patent
Peet et al.

(10) Patent No.: US 9,700,070 B2
(45) Date of Patent: Jul. 11, 2017

(54) LOW BITTER CHICORY PRODUCTS

(71) Applicant: BLUE PRAIRIE BRANDS, INC., Wilmington, DE (US)

(72) Inventors: Richard C. Peet, Wilmington, DE (US); Brad Justice, Wilmington, DE (US)

(73) Assignee: BLUE PRAIRIE BRANDS, INC., Wilmington, DE (US)

( * ) Notice: Subject to any disclaimer, the term of this patent is extended or adjusted under 35 U.S.C. 154(b) by 0 days.

(21) Appl. No.: 14/875,093

(22) Filed: Oct. 5, 2015

(65) Prior Publication Data

US 2016/0095337 A1    Apr. 7, 2016

Related U.S. Application Data

(60) Provisional application No. 62/060,399, filed on Oct. 6, 2014, provisional application No. 62/128,432, filed on Mar. 4, 2015, provisional application No. 62/188,349, filed on Jul. 2, 2015.

(51) Int. Cl.

| A23L 1/212 | (2006.01) |
| A21D 2/36 | (2006.01) |
| A21D 13/06 | (2017.01) |
| A23L 7/109 | (2016.01) |
| A23L 19/00 | (2016.01) |

(52) U.S. Cl.
CPC ............ *A23L 1/2121* (2013.01); *A21D 2/366* (2013.01); *A21D 13/06* (2013.01); *A23L 7/109* (2016.08); *A23L 19/01* (2016.08); *A23L 19/03* (2016.08)

(58) Field of Classification Search
CPC ...... A23L 1/0528; A23L 1/308; A23L 1/2128; A23L 1/164; A23L 1/2121; A23L 1/2123; A23K 10/30; A23K 1/14; A21D 2/36; A21D 13/08; A21D 2/366; A23D 7/0053; A23D 7/015
USPC ....... 426/243, 518, 549, 557, 590, 594, 615, 426/648, 661
See application file for complete search history.

(56) References Cited

U.S. PATENT DOCUMENTS

| 2,161,511 A * | 6/1939 | Freudl ....................... A23F 5/44 426/461 |
| 4,613,377 A | 9/1986 | Yamazaki et al. |
| 5,939,127 A | 8/1999 | Abboud |
| 7,214,507 B2 | 5/2007 | Bouwmeester et al. |
| 2004/0001898 A1 | 1/2004 | Malnoe et al. |
| 2004/0224073 A1 | 11/2004 | Janssens |
| 2004/0241304 A1 | 12/2004 | Bossard et al. |

FOREIGN PATENT DOCUMENTS

| FR | 2834862 A1 * | 7/2003 | ............ A21D 2/366 |
| WO | WO-02/13625 A2 | 2/2002 | |
| WO | WO-03/061405 A1 | 7/2003 | |
| WO | WO 2014/172486 A1 | 10/2014 | |
| WO | WO-2016/057382 A1 | 4/2016 | |

OTHER PUBLICATIONS

Peters et al "A pilot Study on the effects of cultivation conditions of chicory roots on the levels of sesquiterpene lactones", Food Research International vol. 29, Nos. 5-6, pp. 439-444, 1996.*
Ravishankar et al "Chiciritum IntybusL.-cultivation, Processing, utility, value addition and biotechnology, with an emphasis on current status and future prospects", Published in Journal of Science of Food and Agriculture, 81:467-484-2001.*
Nutrition facts and Analysis for chicory Roots, Self Nutrition data, Jun. 9, 2016, 4 pages.*
PCT International Search Report and Written Opinion on application PCT/US2015/053971 mailed Dec. 22, 2015; 10 pages.
Hance et al.; "Quantification of chicory root bitterness by an ELISA for 11β,13-dihydrolactucin"; Food Chemistry, 105: 742-748 (Jan. 2007).
Mona et al.; "Chemical and Technological Studies on Chicory (*Cichorium Intybus* L) and Its Applications in Some Functional Food"; J. Adv. Agric. Res., 14(3): 735-756 (2009).
PCT International Search Report and Written Opinion issued in Application No. PCT/US16/55581 dated Dec. 16, 2016.

* cited by examiner

*Primary Examiner* — Jyoti Chawla
(74) *Attorney, Agent, or Firm* — Foley & Lardner LLP

(57) ABSTRACT

The present invention provides a food product comprising at least 1.5%, 5%, 10%, 20%, 30%, or more, by weight total ingredients of a low bitter chicory plant material or flour. The present invention also provides a method for obtaining a chicory product with reduced bitterness, comprising blanching chicory roots or root chips, drying the blanched chicory root chips, and optionally grinding the dried chicory root chips and incorporating it into flour, dough, or other food products. Also provided is a method for obtaining a chicory taproot with reduced bitterness, comprising cultivating a chicory plant at a soil nitrogen level of 150 lbs per acre or less in the upper 3 feet of the soil.

10 Claims, 12 Drawing Sheets

FIGURE 6

Nutrition Facts

Serving Size 1 cookie (20g)

Amount Per Serving

| Calories 80 | Calories from Fat 35 |
|---|---|

% Daily Value*

| Total Fat 3.5g | 5% |
|---|---|
| Saturated Fat 2g | 10% |
| Trans Fat 0g | |
| Cholesterol 15mg | 5% |
| Sodium 110mg | 5% |
| Total Carbohydrate 11g | 4% |
| Dietary Fiber 3g | 12% |
| Sugars 5g | |
| Protein 1g | |

| Vitamin A 2% | • | Vitamin C 0% |
|---|---|---|
| Calcium 0% | • | Iron 2% |

*Percent Daily Values are based on a 2,000 calorie diet. Your daily values may be higher or lower depending on your calorie needs:

| | | Calories: | 2,000 | 2,500 |
|---|---|---|---|---|
| Total Fat | Less than | | 65g | 80g |
| Saturated Fat | Less than | | 20g | 25g |
| Cholesterol | Less than | | 300mg | 300mg |
| Sodium | Less than | | 2,400mg | 2,400mg |
| Total Carbohydrate | | | 300g | 375g |
| Dietary Fiber | | | 25g | 30g |

Calories per gram:
  Fat 9 • Carbohydrate 4 • Protein 4

FIGURE 9

Nutrition Facts

Serving Size (30g)

Amount Per Serving

| Calories 100 | Calories from Fat 0 |
|---|---|

% Daily Value*

| Total Fat 0g | 0% |
|---|---|
|    Saturated Fat 0g | 0% |
|    Trans Fat 0g | |
| Cholesterol 0mg | 0% |
| Sodium 125mg | 5% |
| Total Carbohydrate 24g | 8% |
|    Dietary Fiber 5g | 20% |
|    Sugars 2g | |
| Protein 2g | |

| Vitamin A 0% | • | Vitamin C 0% |
|---|---|---|
| Calcium 2% | • | Iron 2% |

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
|   Saturated Fat | Less than | 20g | 25g |
| Cholesterol | Less than | 300mg | 300mg |
| Sodium | Less than | 2,400mg | 2,400mg |
| Total Carbohydrate | | 300g | 375g |
|   Dietary Fiber | | 25g | 30g |

Calories per gram:
  Fat 9 • Carbohydrate 4 • Protein 4

FIGURE 10

Nutrition Facts

Serving Size 1 tortilla (46g)

Amount Per Serving

| | |
|---|---|
| Calories 130 | Calories from Fat 20 |

% Daily Value*

| | |
|---|---|
| Total Fat 2.5g | 4% |
|    Saturated Fat 0.5g | 3% |
|    Trans Fat 0g | |
| Cholesterol 0mg | 0% |
| Sodium 300mg | 13% |
| Total Carbohydrate 25g | 8% |
|    Dietary Fiber 5g | 20% |
|    Sugars 0g | |
| Protein 3g | |

| | | |
|---|---|---|
| Vitamin A 0% | • | Vitamin C 0% |
| Calcium 2% | • | Iron 8% |

*Percent Daily Values are based on a 2,000 calorie diet. Your daily values may be higher or lower depending on your calorie needs:

| | | Calories: | 2,000 | 2,500 |
|---|---|---|---|---|
| Total Fat | | Less than | 65g | 80g |
|   Saturated Fat | | Less than | 20g | 25g |
| Cholesterol | | Less than | 300mg | 300mg |
| Sodium | | Less than | 2,400mg | 2,400mg |
| Total Carbohydrate | | | 300g | 375g |
|   Dietary Fiber | | | 25g | 30g |

Calories per gram:
  Fat 9 • Carbohydrate 4 • Protein 4

1

LOW BITTER CHICORY PRODUCTS

CROSS REFERENCE TO RELATED APPLICATIONS

This application claims priority to U.S. Provisional Application No. 62/060,399, filed on Oct. 6, 2014, U.S. Provisional Application No. 62/128,432, filed on Mar. 4, 2015, and U.S. Provisional Application No. 62/188,349, filed on Jul. 2, 2015, the contents of which are all incorporated herein by reference in their entirety.

FIELD OF INVENTION

The present disclosure relates to low bitter chicory chips, flour and products made from low bitter chicory chips and flour, including but not limited to, food products such as dough, health bars, cereals, yogurt, pastries, and the like, as well as pet food and animal feed. The present disclosure also relates to methods for processing chicory plant taproots to produce low bitter chicory chips and flour, as well as methods for producing chicory taproots with low bitterness.

BACKGROUND

Fructan is a polydisperse fructose polymer. Biosynthesis of fructan uses sucrose as the starter molecule to which fructosyl units, obtained from sucrose, are added during the elongation process. Bacterial fructan typically has a very high degree of polymerization (DP) which can reach as many as 100,000 fructose units. In plants, the DP generally does not exceed 100.

Fructan with β(2-1) glycosidic linkages is called inulin. Inulin can result from the elongation of the fructan chain starting from the C1 of the fructose moiety of the initial sucrose. Alternatively, inulin can result from the elongation form the C1 of the fructose moiety as well as from the C6 of the glucose moiety of the starter sucrose.

Fructan with β(2-6) glycosidic linkages is called levan and is produced by bacteria and grasses. Fructan consisting of fructose molecules with two types of linkages is called graminan and mixed levan. The mixed glycosidic linkages results in branched fructan molecules. Branched fructans are found in oats and several other members of the Graminae.

Within the plant kingdom, about 45,000 species, accounting for about 15% of the flowering plants, accumulate fructan as a storage carbohydrate. In these plants, inulin is produced in addition to, or instead of, starch.

Fructan is not digested in the upper part of the human digestive track. The β(2-1) and β(2-6) linkages in fructan are not cleaved by human digestive enzymes involved in starch and sucrose degradation such as maltase, sucrose, isomaltase or β-glucosidase. As a result, approximately 85% of the ingested fructan reaches the colon where it is fermented by beneficial endogenous microflora. The main fermentation products are short chain fatty acids.

Inulin increases the volume of microbial biomass in the colon. With each gram of ingested inulin increases the fecal wet weight by 1.5 to 2 grams.

Increased consumption of fermentable carbohydrate such as the natural chicory fiber inulin results in reduced weight gain and consumption of less food.

Inulin is a reserve carbohydrate in stems and taproots of chicory (*Cichorium intybus* L.) plants. However, the bitterness of the taproots limits their consumption. Presently, the removal of the bitter taste is a costly step in the production of inulin from chicory roots, which makes chicory fibers significantly more expensive than cellulose fibers. Hence, there is a need in the art for an economic process for producing low bitter chicory products (e.g., inulin-containing flour or dough) that avoids the costly steps of inulin extraction from the taproot and the separation thereof from bitter compounds.

SUMMARY OF THE INVENTION

The present application answers the aforementioned need by providing low bitter chicory flour and low bitter chicory products that are enriched in inulin and tasty to consumers. Thus, one aspect of the invention relates to a low bitter chicory flour, food products comprising the low bitter chicory flour, and animal feed comprising the low bitter chicory flour. Examples of food products comprising the low bitter chicory flour include, but are not limited to, dairy products, yoghurts, ice creams, milk-based drinks, milk-based garnishes, puddings, milkshakes, egg custard, cheeses, nutrition bars, energy bars, breakfast bars, confectionery, bakery products, crackers, cookies, biscuits, cereal chips, snack products, ice tea, fruit juice, diet drinks, sodas, sports drinks, powdered drink mixtures for dietary supplementation, infant and baby food, calcium-supplemented orange juice, bread, croissants, breakfast cereals, pasta, noodles, spreads, sugar-free biscuits and chocolates, calcium chews, meat products, mayonnaise, salad dressings, nut butter, sauces and soups. Animal feed comprises, but is not limited to, dog food, cat food, bird feed, cow feed, reptile food, rodent food and the like.

In one aspect of the invention, the chicory plants are cultivated at a soil nitrogen level of 150 libs per acre or less in the upper three feet of the soil. In another aspect of the invention, the chicory plants are cultivated at a soil nitrogen level of 100 libs per acre. In yet another aspect of the invention, the chicory plants are cultivated at a soil nitrogen level of 50 libs per acre.

A different aspect of the invention relates to methods of obtaining a food product with reduced bitterness that comprise cooking chicory taproots at temperatures between 110° and 212° F., and drying the chicory taproots after cooking to reduce moisture to less than 10%. Cooking may be done by any method, including, but not limited to, boiling, microwaving, or steaming.

Additional different aspects of the invention relate to methods of enhancing calcium absorption, enhancing magnesium absorption, reducing appetite, reducing the risk of irritable bowel diseases, reducing the risk of neonatal necrotizing entero-colitis, or reducing the risk of colon cancer in subjects in need thereof, comprising administering a composition comprising a low bitter chicory flour as described herein.

Thus, in one embodiment, the invention provides a low bitter chicory flour, wherein the flour is less bitter than a flour made from the taproots of the chicory variety 'Orchies' as determined in taste test. In one aspect of the invention, the low bitter chicory flour comprises from 10% to 90% less dihydrolactucin compared to a bitter chicory flour made from the taproots of *Chicorium intybus*. In another aspect of the invention, the flour comprises from 10% to 90% less dihydro-8deoxy-lactucin compared to a bitter chicory flour made from the taproots of *Chicorium intybus*. In other aspects of the invention, the flour comprises from 80% less, 70% less, 60% less, 50% less, 40% less, 30% less, 20% less, or 10% less of dihydro-8deoxy-lactucin compared to a bitter chicory flour made from the taproots of *Chicorium intybus*. In a preferred aspect of the invention, the low bitter chicory flour comprises from 10% to 90% less dihydrolactucin, from 10% to 90% less dihydro-8-deoxy-lactucin, and no reduced levels of lactucin, 8-deoxylactucin and lactucopicrin compared to a bitter chicory flour made from the taproots of *Chicorium intybus*.

Preferably, the low bitter chicory flour according to the invention comprises less than 10% by weight of sugar, less than 5% by weight of fat, between 5% and 15% by weight of insoluble fibers, between 50% and 75% by weight of soluble fibers, between 2.5% and 10% by weight of protein, and contains from 10% to 90% less dihydrolactucin and from 10% to 90% less dihydro-8deoxy-lactucin compared to a bitter chicory flour made from the taproots of *Chicorium intybus*. The low bitter chicory flour according to the invention comprises no reduced levels of lactucin, 8-deoxylactucin and lactucopicrin compared to a bitter chicory flour made from the taproots of *Chicorium intybus*.

In a different embodiment, the invention provides a food product comprising at least 1.5% by weight of total ingredients of a low bitter chicory flour, wherein the flour is less bitter than a flour made from the taproots of the chicory variety 'Orchies' as determined in taste test. The food product may be one or more of dairy products, yoghurts, ice creams, milk-based drinks, milk-based garnishes, puddings, milkshakes, egg custard, cheeses, nutrition bars, energy bars, breakfast bars, confectionery, bakery products, crackers, cookies, biscuits, cereal chips, snack products, ice tea, fruit juice, diet drinks, sodas, sports drinks, powdered drink mixtures for dietary supplementation, infant and baby food, calcium-supplemented orange juice, bread, croissants, breakfast cereals, pasta, noodles, spreads, sugar-free biscuits and chocolates, calcium chews, meat products, mayonnaise, salad dressings, nut butter, sauces and soups. In one aspect of the invention, the food product comprises at least 5% of the low bitter chicory flour. In another aspect of the invention, the food product comprises at least 10% by weight of total ingredients of the low bitter chicory flour. In yet another aspect of the invention, the food product comprises at least 20% by weight of total ingredients of the low bitter chicory flour. In a different aspect of the invention, the food product comprises at least 30% by weight of total ingredients of the low bitter chicory flour. In yet another aspect of the invention, the food product comprises at least 40% by weight of total ingredients of the low bitter chicory flour.

In a different embodiment, the invention provides an animal feed comprising at least 1.5% by weight of total ingredients of a low bitter chicory flour, wherein said flour is less bitter than a flour made from the taproots of the chicory variety 'Orchies' as determined in taste test. The animal feed may be one or more of a dog food, cat food, bird feed, cow feed, reptile food and rodent food. In one aspect of the invention, the animal feed comprises from 5% to 20% of the low bitter chicory flour. In a different aspect of the invention, the animal feed comprises from 20% to 40% by weight of total ingredients of the low bitter chicory flour.

In yet another embodiment, the invention provides a method of obtaining a food product with reduced bitterness, comprising cooking chicory taproots at a temperature between 110° and 212° F., drying the chicory taproots after cooking to produce chicory chips, milling the chicory chips to produce chicory flour and producing a food product from the flour.

Milling according to the invention comprises the use of hammer mills, universal mills, pin mills, cutting mills, crushers, mechanical mills with internal classifier, high-compression and table roller mills, jet mills, dry media mills and wet media mills, cryogenic mills, colloid mill, ball mills, impact mills, stirred mills, screen mills, drum mills, high-compression roller and table roller mills, jet, dry-media, wet-media mills, or any combination thereof.

The step of cooking may comprise one or more of boiling, microwaving, steaming or blanching chicory taproots. In one aspect of the invention, the chicory taproots are blanched at a temperature between 140° F. and 160° F. for 1 to 10 minutes. The chicory root chips may be dried at a furnace temperature between 300° F. and 350° F., or in a fluidized bed dryer. In one aspect of the invention, the method further comprises the steps of slicing one or more chicory roots to produce chicory root chips, washing the chicory root chips at a pH between 4 and 6, and grinding the dried chicory root chips to obtain a chicory flour. In an additional aspect of the invention, the chicory flour comprises at least 50% by weight of inulin. In yet another additional aspect of the invention, the method further comprises the steps of incorporating the chicory flour into a flour blend, and producing a food product from the flour blend. The flour blend may further comprise wheat flour, rice flour, brown rice flour, barley flour, oat flour, potato flour, buckwheat flour, rye flour, starch, corn flour, quinoa flour, arrowroot flour, chickpea flour, or combinations thereof.

In yet another embodiment, the invention provides a method of breeding low bitter taproot chicory that comprises selecting chicory plants that have reduced dihydrolactucin content in the taproot compared to the chicory variety 'Orchies', flowering the selected plants, crossing the selected plants either as a male or female, and selecting progeny with reduce dihydrolactucin content in the taproot compared to 'Orchies'.

Additional aspects of the invention are described below. These aspects are exemplary only and in no way limiting.

One aspect of the invention relates to a low bitter chicory flour comprising a reduced dihydrolactucin concentration compared to a bitter chicory flour. The low bitter chicory flour of the present invention has 10, 20, 30, 40, 50, 60, 70, 80, or more percent less dihydrolactucin content compared to a bitter flour.

Another aspect of the invention relates to a low bitter chicory flour comprising a reduced dihydrolactucin and dihydro-8deoxy-lactucin concentration compared to a bitter chicory flour. The low bitter chicory flour of the present invention has 10, 20, 30, 40, 50, 60, 70, 80, or more percent less dihydrolactucin content compared to a bitter flour and 10, 20, 30, 40, 50, 60, 70, 80, or more percent less dihydro-8deoxy-lactucin compared to a bitter chicory flour.

Another aspect of the invention relates to a food product comprising at least 1.5% by weight of total ingredients of a low bitter chicory flour. Yet another aspect of the invention relates to a food product comprising at least 2, 3, 4, 5, 6, 7, 8, 9, 10, 11, 12, 13, 14, 15, 16, 17, 18, 19, 20, 21, 22, 23, 24, 25, 26, 27, 28, 29, 30%, 40%, or more, by weight of total ingredients of a low bitter chicory flour. The food product may be a human food, a pet food or an animal feed. The human food product may be a health bar, a dairy product such as yogurt, a frozen dessert, a salad dressing, baby food, chocolate, among many others. The animal feed or pet food may be formulated for pigs, cattle, sheep, poultry, horses, fish, shrimp, dogs, cats, among others.

One aspect of the invention relates to a method of making a chicory product with reduced bitterness, comprising slicing or size reduction of low bitter chicory taproots to produce chicory root chips. The method further comprises drying the chicory root chips.

In another aspect of the invention the drying step can involve any one of many well-known methods of drying plant material including fluidized bed dryer, rotary dryer, microwave drying, or the like. In some embodiments, the method further comprises milling the dried low bitter chicory chips to produce a low bitter chicory flour.

Yet another aspect of the invention involves drying low bitter chicory chips in a rotary dryer at a temperature between 150° F. and 220° F., more preferably between 180° F. and 200° F., more preferably between 180° F. and 190° F., for a time sufficient to reduce the moisture content of the chips to less than 10%.

Another aspect of the invention involves drying low bitter chicory chips in a fluidized bed dryer at a temperature of between 300° F. and 370° F. for a time sufficient to reduce the moisture content of the chips to less than 10%.

One aspect of the invention relates to a method for obtaining a chicory product with reduced bitterness, comprising cooking chicory root chips and drying the cooked chicory root chips. The cooking step can be done in water, by steaming, by microwave, or some other means of heating the chips. In another aspect of the invention, the cooking occurs at a temperature of between 110° F. and 212° F., more preferably at 160° F., 170° F., 180° F., or 190° F. In yet another aspect of the invention, the cooking step takes place for 0.5, 1.0, 2.0, 3.0, 4.0, 5.0, 6.0, 7.0, 8.0, 9.0, 10.0 or more than 10.0 minutes. Another aspect of the invention involves milling the cooked and dried low bitter chicory chips into a low bitter chicory flour.

Another aspect of the invention involves roasting dried low bitter chicory chips at a temperature and a time sufficient to impart a desired taste profile to the chips for use in special food or drink manufacture.

Another aspect of the invention relates to low bitter chicory root chips obtained by the method described herein.

Another aspect of the invention relates to a low bitter chicory flour obtained by the method described herein.

Another aspect of the invention relates to a flour blend comprising the low bitter chicory flour described herein.

Another aspect of the invention relates to a dough comprising the low bitter chicory flour described herein, which can be adapted for making cookies, bread, baked goods, pasta, tortillas noodles, or the like.

Another aspect of the invention relates to a prebiotic product comprising the low bitter chicory flour described herein.

A further aspect of the invention relates to a method of enhancing calcium absorption, comprising administering a composition comprising the low bitter chicory flour described herein to a subject in need thereof.

A further aspect of the invention relates to a method of enhancing magnesium absorption, comprising administering a composition comprising the low bitter chicory flour described herein to a subject in need thereof.

A further aspect of the invention relates to a method of reducing the risk of irritable bowel diseases, comprising administering a composition comprising the low bitter chicory flour described herein to a subject in need thereof.

A further aspect of the invention relates to a method of reducing the risk of neonatal necrotizing enterocolitis, comprising administering a composition comprising the low bitter chicory flour described herein to a subject in need thereof.

A further aspect of the invention relates to a method of reducing the risk of colon cancer, comprising administering a composition comprising the low bitter chicory flour described herein to a subject in need thereof.

An additional aspect of the invention relates to a method for obtaining a chicory root with reduced bitterness, comprising cultivating a chicory plant at a soil nitrogen level of 150 lbs per acre or less in the upper 3 feet of the soil.

BRIEF DESCRIPTION OF THE DRAWINGS

FIG. 6 shows the nutritional analysis for one chocolate chip cookie made with low bitter chicory flour according to recipe in Example 6.

FIG. 9 shows the nutritional analysis of one serving of pasta made with low bitter chicory flour according to recipe in Example 9.

FIG. 10 shows the nutritional analysis of one tortilla made with low bitter chicory flour according to recipe in Example 10.

DETAILED DESCRIPTION

Figure 1:
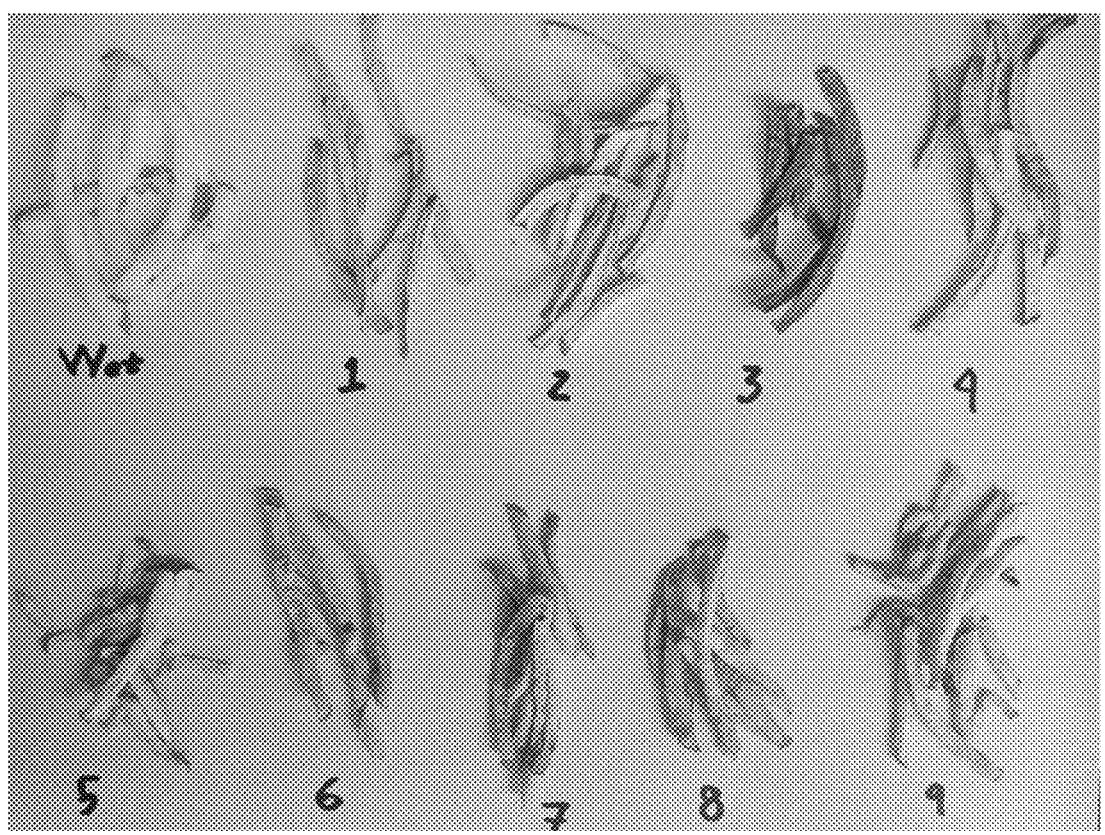
FIG. 1 shows exemplary chicory root chips obtained by different processing methods.

Throughout the following description, the specification and drawings are to be regarded in an illustrative, rather than a restrictive.

In the description and examples that follow, a number of terms are used. In order to provide a clear and consistent understanding of the specification and claims, including the scope to be given such terms, the following definitions are provided. If no definition is provided, all other technical and scientific terms used herein have the same meaning as is commonly understood by one of skill in the art to which the invention belongs.

CHICORY PLANT. The chicory plant produces large quantities of inulins in the taproot. Chicory (*Cichorium intybus* L.) is native to Europe, North Africa, and Western Asia and naturalized in North America. There are many commercial uses of the plant, leading to the development of several distinct cultivars. Chicory roots can be dried and roasted and used as a coffee substitute. Inulin can be extracted from the chicory taproot to make a dried product or syrup which is then added to foods and beverages. The chicons (shoots and leaves) can be used for consumption in salads and vegetable dishes. Chicory produces a blue flower. The taproots of chicory, used in former days as coffee substitutes, are very bitter in taste. The bitterness of the commercial variety 'Orchies' is described in this application in terms of sensory tests and sesquiterpene lactone profile. The variety 'Orchies' produces bitter taproots and the flour made from 'Orchies' taproots is also bitter. Until the present invention, all known varieties and selections of taproot chicory had the same bitter taste and sesquiterpene lactone profile as plant variety 'Orchies' including popular commercial varieties 'Selenite', 'Obsidienne', and 'Malachite'. Chicory is a biennial plant. During the first season, the plants remain in the vegetative phase and put forth only leaves, taproots, and fibrous roots. The roots look like small oblong sugar beets. The inulin content is high (16-18% fresh weight) and fairly constant from year to year for a given region. Yields generally vary from 20 to 45 tons taproots per hectare. Chicory is the main industrial crop for inulin production. See Roberfroid Inulin-type fructans function food ingredients Page 46-67 (2004).

CHIPS. Chips are slices of the chicory taproot. According to conventional methods of processing, chicory taproots are harvested from the field, washed, sliced or size reduced into chips, and dried into dried chips. Once the chips are dried, enzymes that breakdown inulin (oligofructose) are inactivated and the chips can be stored for further processing. The size and configuration of the chips can be varied using different slicers.

FRUCTAN. Fructans are fructose-based oligo or polysaccharides, and the precise type and degree of polymerization are species and even tissue specific.

INULIN. Inulin is a carbohydrate that occurs in many plants and bacteria. Inulin from the plant origin consists of a polydisperse composition of chains of oligo- and polysaccharides which are composed of fructose units linked to each other through β(2-1) fructosyl-fructose linkages, and which mostly terminate in one glucose unit. Inulin from plant origin is usually composed of linear chains, but may also contain some branched chains. Main plant sources for inulin are roots of chicory (*Cichorium intybus*) and tubers from Dahlia and Jerusalem artichoke, in which inulin can be present, respectively, in concentrations of about 15-18%, 12% and 14 to 18% on a fresh weight basis. Inulin can be extracted from these plant parts, purified and optionally fractionated to remove impurities, mono- and disaccharides and undesired oligosaccharides, in order to provide various grades of inulin. Inulin can be generally represented, depending from the terminal carbohydrate unit, by the general formulae $GF_n$ and $F_m$, wherein G represents a glucose unit, F represents a fructose unit, n is an integer representing the number of fructose units linked to the terminal glucose unit, and m is an integer representing the number of fructose units linked to each other in the carbohydrate chain.

Inulin is considered the most studied of prebiotics, non-digestible food substances that pass through the stomach and small intestine fully intact before they are fermented by beneficial bacteria in the colon. This fermentation cleans up the colon by stimulating growth of this good bacteria and inhibiting growth of less-desired inhabitants. Both activities benefit digestive health. Beyond its prebiotic effect and calcium absorption qualities, inulin could very well benefit celiacs in other ways. Gluten-free breads represent an area of the food sector in much need of work. Nutritionally speaking, these breads usually consist of refined flours and starches that are likely low in fiber. The addition of inulin would increase the content of soluble fiber to these breads.

DEGREE OF POLYMERIZATION (DP). The number of saccharide units (fructose and glucose units) in one molecule, i.e. the values n+1 and m in the above formulae, are commonly referred to as the degree of polymerization (DP). The DP of native chicory inulin ranges from 3 to about 70. The mean DP of known standard grade chicory inulin, i.e. inulin obtained from chicory roots which have been grown and processed under known, conventional conditions, ranges from about 9 to 11, and is typically about 10.

SESQUITERPENE LACTONES. Sesquiterpene lactones are a major class of plant secondary metabolites. They are terpenoid compounds that have a range of biological activities. Sesquiterpene lactone is characterized by 15 carbon core backbone.

REDUCED OR DECREASED BITTERNESS. Reduced or decreased bitterness as used herein refers to a decrease in bitterness constituents, i.e. molecules that confer a bitter taste. The bitterness of chicory products can be attributed to sesquiterpenoid lactones, which can be determined qualitatively and quantitatively using HPLC. A decrease of bitterness in a chicory product obtained according to the present invention can be determined relative to a corresponding chicory product obtained according to conventional processing methods as described herein. The reduction in bitterness can be determined by means of taste tests, chemical analysis of sesquiterpene lactone concentrations, or equivalent means.

PREBIOTICS. Prebiotics are non-digestible ingredients, including any compounds, nutrients, or additional microbes applied as a single additive or as a mixture, together with probiotics or without probiotics, in order to confer health benefits on a subject. Representative prebiotics include, but are not limited to, fructooligosaccharides (FOS) including inulin and banana fiber, xylooligosaccharides (XOS), galactooligosaccharides, and mannooligosaccharides.

PROBIOTICS. Probiotics are live or non-replicating micro-organisms which, when administered in adequate amounts, confer a health benefit on the host. Probiotic micro-organisms may be selected from the group consisting of bifidobacteria, lactobacilli, propionibacteria, or combinations thereof, for example, *Bifidobacterium breve, Bifidobacterium longum, Bifidobacterium lactis, Bifidobacterium animalis, Bifidobacterium infantis, Bifidobacterium adolescentis, Lactobacillus acidophilus, Lactobacillus casei, Lactobacillus paracasei, Lactobacillus salivarius, Lactobacillus rhamnosus, Lactobacillus johnsonii, Lactobacillus plantarum, Lactobacillus fermentum, Lactococcus lactis, Streptococcus thermophiles, Lactococcus lactis, Lactobacillus reuteri, Lactococcus diacetylactis, Lactococcus cremoris, Lactobacillus bulgaricus, Lactobacillus helveticus, Lactobacillus delbrueckii*, and/or mixtures thereof. Probiotics may be added to human food, pet food or animal feed, together with prebiotics, such as inulin-containing low bitter chicory flour. Since inulin stimulates the growth of bifidobacteria and lactobacilli, for example, it is expected that probiotics and prebiotics may work synergistically to improve health.

SENSORY EVALUATION AND TEST. Double blind sensory evaluation and test of conventional bitter chicory products and low bitter chicory products was based on appearance, flavor, texture, taste, aroma and feel of the products. Appearance included size, shape, condition and color of the products and evaluation was made on both the exterior and the interior of the chicory products. Color of the products was measured by colorimeter. Texture refers to the texture to the fingers, tongue, teeth and palate, including overall mouthfeel, as determined by chewiness, graininess, firmness, brittleness, crispness and consistency. Taste was determined based on flavor (sweet, salty, sour, bitter and savory). Aroma was determined by wafting test plates to the nostrils of subjects who did not see the products first.

Manufacture of Low Bitter Chicory Products

The conventional method of producing chicory flour or syrup comprises the steps of (1) dehydrating fresh roots to obtain chips; (2) typically roasting the plant material at about 130° C.; (3) cooling and crushing; and 4) extracting inulin by passing hot water through the crushed taproot plant material. During this conventional process, the roasting step reduces bitterness to some extent but not sufficiently to make the chicory flour of the instant invention. As a consequence, in the prior art processes for inulin production the inulin must be purified from dried or roasted chicory chips to remove and separate inulin from the bitter compounds. In addition, the roasting process induces the cleavage of inulin into fructose and glucose under the combined action of temperature and moisture. The roasting process only partially reduces the inulin content, imparts a distinct flavor profile to the material, increases browning of the plant material and increases the cost of inulin and chicory fiber because of the required purification process.

In contrast, the processes of the instant invention, avoid the need for roasting. The chicory plants are inherently low bitter or are grown in low nitrogen soils to produce low bitter chicory plant material from which chicory chips are dried and milled into flour. Alternatively, the chicory plant material or chips are dried, cooked and milled into flour. Cooking involves heating the plant material in the presence of exogenous water such as pot of water, steam, and the like. In contrast, roasting involves heating the plant material in the absence of exogenous water. There is no need to purify the inulin to remove bitter compounds. There is no need to roast the plant material or chips resulting in loss of inulin content, browning and modification of the flavor profile.

Milling includes grinding, cutting, pressing and/or crushing. Milling according to the invention comprises the use of hammer mills, universal mills, pin mills, cutting mills, crushers, mechanical mills with internal classifier, high-compression and table roller mills, jet mills, dry media mills and wet media mills, cryogenic mills, colloid mill, ball mills, impact mills, stirred mills, screen mills, drum mills, high-compression roller and table roller mills, jet, dry-media, wet-media mills, or any combination thereof. Dry chicory chips having no more than 10% moisture content are blended, milled using a roller mill, sorted through a series of break rolls and reduction rolls, and then sifted before being automatically packed into bags ready for delivery to shops or supermarkets.

In contrast to conventional methods known in the prior art, according to one embodiment of the present invention, low bitter plant material, chips and flour can be made directly from the taproots of low bitter chicory plants. In another embodiment, the chips made from low bitter chicory taproots are cooked at a temperature of between 110° F. and 212° F., and then milled into flour. In some embodiments, the chicory root chips are cooked at 140° F. or higher. In some embodiments, the chicory root chips are blanched at 160° F. or higher. In some embodiments, the chicory root chips are blanched at 170° F. or higher. In some embodiments, the chicory root chips are blanched at 180° F. or higher. In some embodiments, the chicory root chips are blanched at about 180° F. The chips are cooked for 0.5, 1.0, 2.0, 3.0, 4.0, 5.0, 6.0, 7.0, 8.0, 9.0, 10, or more minutes. Alternatively, the chips are cooked by means of steam, microwaving or some other equivalent method.

In some embodiments, the chicory root chips are dried using a fluidized bed dryer. In some embodiments, the chicory root chips are dried at a fluidized temperature of 300° F. or higher. In some embodiments, the chicory root chips are dried at a furnace temperature of 330° F. or higher. In some embodiments, the chicory root chips are dried at a furnace temperature of 350° F. or higher. In some embodiments, the chicory root chips are dried at a furnace temperature of 360° F. or higher. In some embodiments, the chicory root chips are dried at a furnace temperature of about 368° F.

The chicory plant material or chips can be dried in any of the many well know ways to the reduce moisture content to less than 10% to include freeze drying, microwaving, heating in dryers, and equivalent processes. The dryers can be drum dryers, fluidized bed dryers, rotating drum dryers and the like.

Regardless of the method of drying, the temperature and time of drying is adjusted to achieve a moisture content of less than 10%. Furthermore, the temperature and time of drying is adjusted to avoid browning of the plant material. In general, the goal is to produce white or light brown low bitter chicory chips or flour. For certain food applications, a more brown product may be desired.

In some embodiments, the method further comprises washing the chicory root chips at a pH of 6 or lower. In some embodiments, the method further comprises washing the chicory root chips at a pH of 5 or lower. In some embodiments, the method further comprises washing the chicory root chips at a pH of 4 or lower. Furthermore, the pH of the cooking step can be adjusted to between pH 4 and pH 8.

In some embodiments, the method further comprises washing the chicory root chips in an acid for about 1-30 minutes. In some embodiments, the method further comprises washing the chicory root chips in an acid for about 1-20 minutes. In some embodiments, the method further comprises washing the chicory root chips in an acid for about 1-10 minutes. In some embodiments, the method further comprises washing the chicory root chips using citric acid.

In some embodiments, the method further comprises grinding the dried low bitter chicory root chips to obtain a low bitter chicory flour. In some embodiments, the method further comprises incorporating the low bitter chicory flour into a flour blend. In some embodiments, the method further comprises incorporating the low bitter chicory flour into a dough. In some embodiments, the method further comprises incorporating the low bitter chicory flour into a food product.

Low Bitter Chicory Food Products

Another aspect of the invention relates to low bitter chicory products obtained by the methods described above.

In some embodiments, the low bitter chicory product is a dried chicory root chip. In some embodiments, the low bitter chicory product is a chicory flour.

In some embodiments, the chicory flour or chicory root chip comprises 40 wt. % or more of inulin on a dry weight basis. In some embodiments, the chicory flour or chicory root chips comprises 50 wt. % or more of inulin on a dry weight basis. In some embodiments, the chicory flour or chicory root chip comprises 55 wt. % or more of inulin on a dry weight basis. In some embodiments, the chicory flour or chicory root chip comprises 60 wt. % or more of inulin on a dry weight basis.

In some embodiments, the low bitter chicory flour or chicory root chips comprise 40 wt. % or less of non-inulin carbohydrates on a dry weight basis. In some embodiments, the low bitter chicory flour or chicory root chips comprise 30 wt. % or less of non-inulin carbohydrates on a dry weight basis. In some embodiments, the low bitter chicory flour or chicory root chips comprise 20 wt. % or less of non-inulin carbohydrates on a dry weight basis. In some embodiments, the low bitter chicory flour or chicory root chips comprise 15 wt. % or less of non-inulin carbohydrates on a dry weight basis.

Another aspect of the invention relates to a flour blend comprising the low bitter chicory flour described above. In some embodiments, the flour blend comprises 1% to 100% by weight of the chicory flour. In some embodiments, the flour blend comprises 1% to 50% by weight of the chicory flour. In some embodiments, the flour blend further comprises wheat flour, rice flour, brown rice flour, barley flour, oat flour, potato flour, buckwheat flour, rye flour, starch, corn flour, arrowroot flour, quinoa flour, chickpea flour, or combinations thereof. The chicory flour or the flour blend comprising chicory flour can be used to make baked good, noodles, pasta bread, pastries and other flour-containing foods.

Another aspect of the invention relates to a dough comprising the low bitter chicory flour described above. In some embodiments, the low bitter chicory flour partially replaces the flour and/or sugar content of a corresponding conventional dough. In some embodiments, the low bitter chicory flour replaces at least 10 wt. % of the flour content of a corresponding conventional dough. In some embodiments, the chicory flour replaces at least 20 wt. % of the flour content of a corresponding conventional dough. In some embodiments, the low bitter chicory flour replaces at least 40 wt. % of the flour content of a corresponding conventional dough. In some embodiments, the chicory flour replaces at least 60 wt. % of the flour content of a corresponding conventional dough. In some embodiments, the low bitter chicory flour replaces at least 10 wt. % of the sugar content of a corresponding conventional dough. In some embodiments, the chicory flour replaces at least 20 wt. % of the sugar content of a corresponding conventional dough. In some embodiments, the low bitter chicory flour replaces at least 30 wt. % of the sugar content of a corresponding conventional dough.

In some embodiments, the dough is adapted for making bread, baked goods, pasta or noodles. The baked good can be made by various processes, such as a process comprising: 1) preparing a dough which comprises the low bitter chicory flour or the flour blend and water; 2) shaping the dough to individual pieces; 3) subjecting the pieces to a baking temperature between 100 and 400° C. Step 1 may include a yeast, preferably a baker's yeast (species: *Saccharomyces cerevisiae*). Step 2 may include rolling of the dough in various forms. The baked good obtained at the end of the step 3 may be a flat bread, which may include Indian flat breads such as roti, naan and chapatti, but also wheat based tortilla's, pizza and focaccia.

Apart from baked goods, the dough of the present invention is also suitable for making noodles. A noodle can have made different shape but typically is a type of food with a thin and elongated shape made from a dough. The noodles according to the invention may be prepared by extrusion of the dough, or rolling or cutting of thin sheets of dough. After this preparation, the noodles may be dried or fried, or both dried and fried. The noodles may also be shallow fried or deep fried. Before consumption, the noodles are typically be cooked in hot or boiling water or in a mixture of hot or boiling water and oil. The noodles may also comprise commonly used seasoning, including salt, pepper, herbs and spices. The noodles may also comprise edible oil, preferably vegetable oil.

The chicory flour or flour blend of the present invention may be used in the preparation of a pasta. Pasta is a generic term for noodles made from an unleavened dough of wheat flour and water. The pasta is commercially available in fresh, dried or frozen form. Pasta typically contains eggs, but may also be prepared eggless. Pasta may further comprise water, oil (preferably olive oil), salt and seasoning.

Another aspect of the invention relates to a food product comprising the chicory flour described above. In some embodiments, the food product is selected from the group consisting of dairy products, yoghurts, ice creams, milk-based drinks, milk-based garnishes, puddings, milkshakes, egg custard, nutrition bars, energy bars, breakfast bars, confectionery, bakery products, crackers, cookies, biscuits, cereal chips, snack products, ice tea, fruit juice, diet drinks, sodas, sports drinks, powdered drink mixtures for dietary supplementation, infant and baby food, calcium-supplemented orange juice, bread, croissants, breakfast cereals, noodles, spreads, sugar-free biscuits and chocolates, calcium chews, meat products, mayonnaise, salad dressings, nut butter, sauces, soups, cream, curd, butter, milk, skim milk, buttermilk, cheese, such as cream cheese, soft cheese, sliced cheese, hard cheese, whey and milk powder.

In some embodiments, the food product is a cookie. In some embodiments, low bitter chicory flour comprises 1-30 wt. % of the cookie dough. In some embodiments, chicory flour comprises 1-20 wt. % of the cookie dough. In some embodiments, chicory flour comprises 1-15 wt. % of the cookie dough. In some embodiments, chicory flour comprises 1-10 wt. % of the cookie dough. In some embodiments, non-chicory flour comprises 25 wt. % or less of the cookie dough. In some embodiments, non-chicory flour comprises 20 wt. % or less of the cookie dough. In some embodiments, non-chicory flour comprises 15 wt. % or less of the cookie dough. In some embodiments, non-chicory flour comprises 10 wt. % or less of the cookie dough. In some embodiments, sugar comprises 25 wt. % or less of the cookie dough. In some embodiments, sugar comprises 20 wt. % or less of the cookie dough. In some embodiments, sugar comprises 15 wt. % or less of the cookie dough.

In some embodiments, the food product is a bread. In some embodiments, low bitter chicory flour comprises 1-40 wt. % of the flour blend for making the bread. In some embodiments, chicory flour comprises 1-15 wt. % of the flour blend for making the bread. In some embodiments, low bitter chicory flour comprises 1-30 wt. % of the flour blend for making the bread. In some embodiments, chicory flour comprises 1-15 wt. % of the flour blend for making the bread. In some embodiments, chicory flour comprises 1-10 wt. % of the flour blend for making the bread. In some embodiments, chicory flour comprises 1-5 wt. % of the flour blend for making the bread.

In some embodiments, the low bitter chicory product is a prebiotic product or a dietary supplement comprising the chicory flour described above. Prebiotics stimulate the multiplication of the health-promoting probiotics in a subject, with indigenous *Bifidobacterium* and *Lactobacillus* as preferred targets. In addition to its function in stimulating the growth and activity of probiotics, prebiotics also function to resist gastric acidity and hydrolysis by mammalian enzymes and gastrointestinal absorption and some prebiotics are capable of fermentation by intestinal microflora. In other embodiment, the low bitter chicory product is combined with probiotic bacteria such as members of the bifidocteria and lactobilla, among others, to benefit from the synergistic action of combining a prebiotic with a probiotic.

In some embodiments, the low bitter chicory product is a low-fat product which incorporates longer-chain inulin for enhancing viscosity and mouth feel, even without the use of gums or other hydrocolloids.

In some embodiments, the low bitter chicory product is a low-calorie sweetener. Inulin's residual sugar can act as the bulking agent lost when sugar is replaced with stevia or another high-intensity sweetener. And because inulin is an indigestible carbohydrate, it has a negligible effect on blood sugar response after eating. In addition, inulin is a known appetite suppressant.

In some embodiments, the low bitter chicory product is a gluten-free food. Low bitter chicory flour can be combined with other gluten-free ingredients to make gluten-free foods including health bars, baked goods, breads, pastas, and many other food products.

Low Bitter Chicory Pet Food and Animal Feed

Fructans, including inulin, are incorporated into pet food and animal feed to improve animal gut health by promoting the growth of beneficial bacteria. Chicory taproots are frequently used as a source of inulin. However, the high concentrations of bitter sesquiterpene lactones in the chicory plant material can make the food and feed unpalatable to the animal. Dogs, for example, dislike bitter foods. Consequently, only very limited quantities of bitter chicory taproot plant material can be incorporated into pet food and animal feed.

Purified inulin made from chicory is typically too expensive to include in pet food and animal feed. The low bitter chicory products described herein can be directly incorporated into pet food and animal feed at higher concentrations than high bitter chicory because the low bitter products are more palatable to the animals. On a dry matter basis, low bitter chicory taproot chips or flour may comprise 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 50 or more percent by weight of the pet food or animal feed.

The low bitter chicory products described herein can also be used to make stock feeds. In recent years, the demand for edible meat has increased. Animals are typically grown in high density and frequently this leads to disease outbreaks. In particular, diarrhea in infant animals during the weaning period has an undesirable influence on their increase in body weight, and in some cases, increased mortality. In order to reduce diarrhea and loose passage in the stock, particularly infant stock, stock feeds containing an antibiotic are employed, but the effect of the antibiotic is not considered to be sufficient. Furthermore, there is a desire to reduce use of antibiotics in livestock to reduce the incidence of antibiotic-resistant bacteria which can present a health risk to humans. The chicory products described herein can be added to stock feeds to serve as prebiotics to the stock and multiply the number of beneficial microorganisms present in the alimentary canal of animals. Accordingly, another aspect of the present invention is directed to an additive for stock feed comprising the chicory products described herein.

The pet food or animal feed may be in the form of a dried food such as biscuits or kibbles, a processed grain feed, a wet animal food, chews, treats, and the like. Food compositions are typically nutritionally balanced. They may contain on a dry matter basis from about 20% to about 50% crude protein. The crude protein may include vegetable proteins such as soybean, cotton seed and peanut, animal proteins such as casein, albumin and meat tissue such as poultry meal, bone meal, fish meal, and the like. The food composition may contain, on a dry matter basis, from about 5% to about 35% fat, by weight of the composition.

The pet food and animal feed compositions of the present invention may also comprise a source of carbohydrate including grains or cereals such as corn, milo, sorghum, rice, wheat, alfalfa, barley, and the like. The compositions may also contain dairy by-products such as whey. The compositions may also contain living or non-replicating probiotic microbes.

The low bitter chicory-containing pet foods and animal feed of the instant invention can be prepared by any of the many methods well known to manufacturers including, but not limited to, extrusion cooking, baking, cooking in a steam ovens, among others. The animal feed and pet food may be supplemented with vitamins, micronutrients, and other ingredients well known to manufacturers.

Cultivation and Breeding of Low Bitter Chicory Roots and Plant Varieties

A further aspect of the invention relates to a method for obtaining a chicory root with reduced bitterness, comprising cultivating a chicory plant at a soil nitrogen level of 150 lbs per acre or less in the upper 3 feet of the soil.

In some embodiments, the soil nitrogen level is 125 lbs per acre or less in the upper 3 feet of the soil. In some embodiments, the soil nitrogen level is 100 lbs per acre or less in the upper 3 feet of the soil. In some embodiments, the soil nitrogen level is 75 lbs per acre or less in the upper 3 feet of the soil. In some embodiments, the soil nitrogen level is 50 lbs per acre or less in the upper 3 feet of the soil. In some embodiments, the soil nitrogen level is 25 lbs per acre or less in the upper 3 feet of the soil.

In some embodiments, the content of sesquiterpene lactones in the chicory root is reduced by 2% or more compared to a corresponding chicory plant cultivated at a soil nitrogen level of 200 fibres per acre in the upper 3 feet of the soil. In some embodiments, the content of sesquiterpene lactones in the chicory root is reduced by 5% or more compared to a corresponding chicory plant cultivated at a soil nitrogen level of 200 lbs per acre in the upper 3 feet of the soil. In some embodiments, the content of sesquiterpene lactones in the chicory root is reduced by 10% or more compared to a corresponding chicory plant cultivated at a soil nitrogen level of 200 lbs per acre in the upper 3 feet of the soil. In some embodiments, the content of sesquiterpene lactones in the chicory root is reduced by 15% or more compared to a corresponding chicory plant cultivated at a soil nitrogen level of 200 lbs per acre in the upper 3 feet of the soil.

Breeding of new low bitter taproot chicory varieties can be readily achieved by traditional breeding methods involving crosses between chicory variety 'Chrysolite', or other low bitter selections, and high bitter taproot chicory varieties or selections. Progeny exhibiting the low bitter trait are selected. In general, chicory is self-incompatible. However, self-incompatibility is not complete. Selfing ranges from less than 1% to as high as 20% in some selections. Chicory is diploid and has 9 chromosomes.

Low bitter taproot chicory selections are identified in the following manner. Taproots are harvested and individual taproots labeled with a number. A tissue samples is taken from each harvested taproot and the tissue sample is labeled with the number of the taproot from which it was taken. Following sampling, each labeled taproot is stored in a refrigerator. The tissue sample is either dried, or cooked and dried, according to the methods described herein, and the bitterness of the resulting dried chips compared to known bitter varieties. Alternatively, or in addition to, evaluating the bitterness of dried chips, the sesquiterpene lactone profile of each sample is determined according to the methods described herein to identify those taproots with reduced levels of dihydrolactucin and/or dihydro-8deoxy-lactucin when compared to tissue samples taken from the taproots of known bitter varieties. The stored taproot corresponding to chips exhibiting the low bitter phenotype are planted in soilless medium in the greenhouse and allowed to produce flowers. Crosses are made between the low bitter selections and the progeny from these crosses are evaluated for bitterness according to the methods of the invention. New low bitter taproot chicory selections can be increased by means of recurrent selection. At the same time, improvement in yield, inulin content, decreased bolting and other agronomic traits are achieved by selection among segregating population of low bitter progeny.

It is possible to select and inbreed self-compatible chicory lines. According to this method, low bitter and self-compatible selections are identified and selfed to produce low bitter progeny. Alternatively, a taproot chicory population is grown and selections are made based on bitterness or sesquiterpene profile according to the methods described herein. Samples are taken from final selections for laboratory testing of dry matter content. Selections with high dry matter are then grown for seed and also preserved in vitro. Germination rates of the selections are determine, reselected for low bitterness and corresponding in vitro cultures of the best selections are regenerated using known methods to produce seed which is massed and place in another population for another found of selection. Following several rounds of selection the best populations are intercrossed and evaluated for best hybrid combinations.

EXAMPLES

Example 1—Chicory Root Processing for Reducing Bitterness

GROWING CONDITION. Chicory variety 'Chrysolite' was grown in Scottsbluff, Nebr. The chicory seeds were planted in April, 2014, using conventional sugar beet planters. After planting, 120 lbs/acre of nitrogen was applied. The chicory taproots were harvest in September 2014, using conventional sugar beet harvesters modified for collecting chicory taproot.

HARVESTING CONDITIONS. Roots were collected at the University of Nebraska Panhandle Research & Extension Center in Scottsbluff, Nebr. on Sep. 9, 2014. A tractor outfitted with a harvesting foot was run over a row of root chicory ("roots"). Roots were collected by hand. Knives were used to free loose dirt and to remove the top of the root and greens. Harvested roots were transferred to plastic bins for transport. Roots possessing visible rot were not harvested. Roots were transported at 70° F. for 7 hours to Lincoln, Nebr. The roots were stored overnight with ventilation.

ROOT SELECTION, CLEANING AND SLICING. Intact roots free of rot were selected and washed in a deep stainless steel basin to remove dirt. Clean roots were chopped or inserted whole into a DITO Dean TR22 electric slicer outfitted with a julienne style blade. Sliced root chips are collected in water before being drained and weighed for drying. Chips measured 5 mm×3.6 mm with a typical length of 40-60 mm. After drying the chips measured 4.0 mm×2.6 mm and the length seemed only slightly changed.

Figure 4:
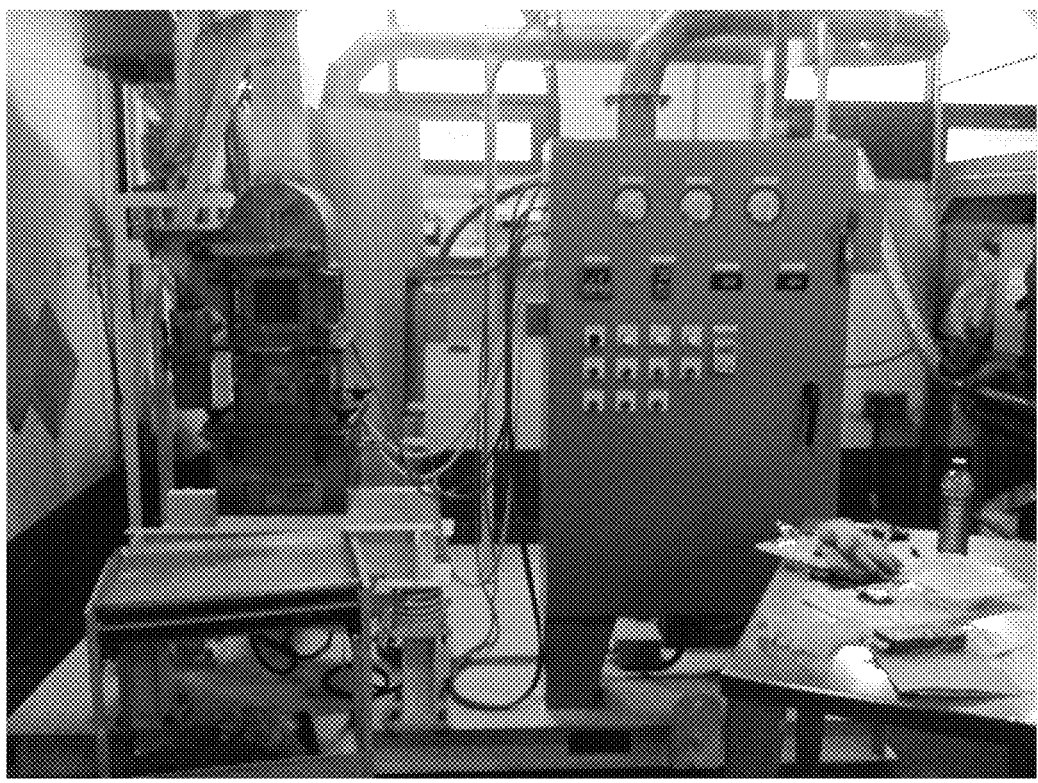
FIG. 4 shows an exemplary fluidized bed dryer for drying chicory root chips, which includes an illuminated control panel, fans for input and output, a drying chamber and a furnace to heat the air. The entire device is mounted to a white metal skid.

ROOT DRYING. Roots were dried using a Carrier Vibrating Corporation pilot scale fluidized bed dryer as shown in FIG. 4 (Model Number: W-12AQ; Serial Number: 26733; Stroke: 3/16"; Volts: 460; RPM: 885; Amps: 0.6 EA). The settings for the device were as follows: Furnace temp/set point: 366° F.; Material temp: Probe out—NA; Exhaust temp initial: 353 (changes over time 158 to 256° F. after material addition); Air pressure initial: 4.8", 50 hz (pressure ranges from 4.0 to 4.6 after material addition). The drying time was 7 to 9 minutes in a 1'×1' chamber. A maximum of 10 lbs (4540 grams) of wet root could be loaded into the dryer.

The Carrier Fluidized bed dryer contained an illuminated control panel, fans for input and output, a drying chamber and a furnace to heat the air. The entire device was mounted to the white metal skid.

EVALUATING DRYING CONDITIONS. A variety of drying times and washing/blanching conditions were evaluated, with the results showing in FIG. 1. Samples 1, 2 and 3 represent various drying times. The longer the drying time and consequently darker color made the root profoundly bitter. A lighter color was pursued for both appearance in products and flavor. Sample 4 evaluated the impact of a pH 4 citric acid wash for 10 minutes. The flavor was slightly improved. Sample 5 evaluated the effect of blanching the roots at 180 degree F. for 2 minutes before drying. These roots possessed the best flavor and color. Sample 6 combined the low pH and blanching. There was no apparent contribution of pH. Samples 7, 8 and 9 were all blanched and dried.

Moisture content was calculated from the average of two measurements from a Ohaus MB35 Halogen and MB45 moisture content analyzers. Moisture ranged from <1% to 8% and was fully dependent on the drying process and correlated strongly to color and flavor. Darker and bitterer chips possessed the lowest amounts of moisture under 1%. The drying condition for one example with maximum load is provided in Table 1.

TABLE 1

Product: Chicory Root
Conversion: 14.9%
Moisture content 7%
Blanch time: 2 min @180 F.
Wet weight (g): 4540
Dry weight (g): 675

| Time (min) | Furnace Temp (° F.) | Material Temp | Exhaust Temp (° F.) | Air Pressure (in.) | Fan Speed (Hz) |
|---|---|---|---|---|---|
| 0 | 368 | NA | 353 | 4.8 | 50 |
| 1 | 368 | NA | 190 | 4 | 50 |
| 2 | 368 | NA | 180 | 4.1 | 50 |
| 3 | 368 | NA | 164 | 4.2 | 50 |
| 4 | 368 | NA | 158 | 4.2 | 50 |
| 5 | 368 | NA | 184 | 4.4 | 50 |
| 6 | 368 | NA | 198 | 4.5 | 50 |
| 7 | 366 | NA | 209 | 4.5 | 50 |
| 8 | 316/off | NA | 228 | 4.6 | 50 |
| 9 | off | NA | 253 | off/4.0 | off |
| 10 | off | NA | 262 | off/3.5 | off |
| 11 | off | NA | 257 | off/2.5 | off |
| 12 | off | NA | 256 | off/1.5 | off |
| 13 | | | | | |

Flour and Chocolate Chip Cookies.

Figure 2:
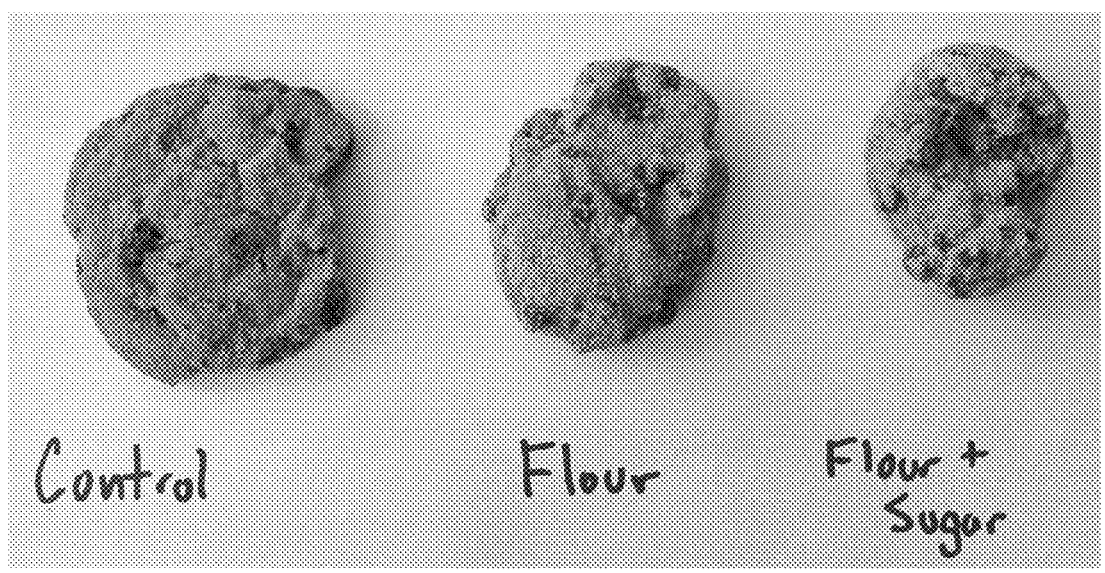
FIG. 2 shows exemplary cookies made from dough comprising about 20 wt. % of chicory flour.
Figure 3:
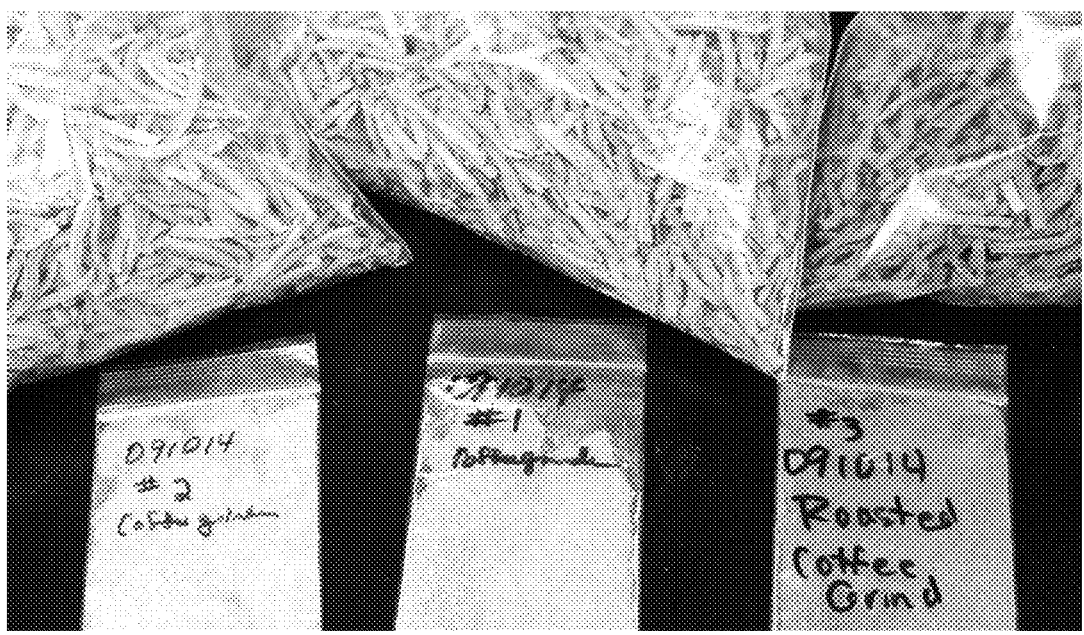
FIG. 3 shows exemplary chicory root chips and chicory flours made therefrom.

To evaluate the flavor and inclusion of root flour we prepared recipes with chicory flour, including it at 20% of the final dough mass. Flour was produced in a blade style countertop coffee grinder and sieved through a 40 mesh (0.420 mm) sieve to remove unground or large particles. The light, crispy structure of the chips makes them easy to crush/grind. Three chocolate chip cookie conditions were evaluated: 1) a control cookie, 2) a cookie in which wheat flour was partially substituted with root flour and, 3) a cookie in which the sugar and wheat flour were partially replaced with root flour, as shown in FIG. 2. Chips from Samples 5 and 9 of Example 1 were used to produce the flour. The flavor of cookies made with both Samples 5 and 9 were judged by at least one dozen individuals including a professional food sensory scientist. Sensory attributes consisting of texture, taste, overall quality and breaking strength were assessed. All individuals found that these cookies had superior characteristics as compared to control cookies, including overall improved mouthfeel, smooth and soft (buttery texture) as compared to the control cookies' fibrous texture, and perceived sweetness. This example confirms the ability to include at least 20% by total weight of low bitter chicory flour, made by the methods described herein, in cookie dough without impacting flavor.

The recipes for the control cookie, the cookie in which wheat flour was partially substituted with root flour and, and the cookie in which the sugar and wheat flour were partially replaced with root flour are provided in Tables 2 to 4. The total dough weight was 719.6 grams.

TABLE 2

Control

| Item | ESHA Code | Mass Added (grams) |
| --- | --- | --- |
| Flour, AP, bleached, enriched | 38030 | 208.3 |
| Baking Soda | 28003 | 3.5 |
| Salt, table | 26014 | 4.5 |
| Shortening | 8283 | 121.6 |
| Sugar, brown packed | 25005 | 96.6 |
| Sugar, white granulated | 25006 | 88.2 |
| Egg, whole raw | 19500 | 57 |
| Water, tap | 20041 | 3.7 |
| Flavor, *vanilla* extract | 26624 | 1.6 |
| Baking chips, real chocolate | 23313 | 134.6 |

TABLE 3

Flour Substitution

| Item | ESHA Code | Mass Added (grams) |
| --- | --- | --- |
| Flour, AP, bleached, enriched | 38030 | 64.2 |
| Baking Soda | 28003 | 3.5 |
| Salt, table | 26014 | 4.5 |
| Shortening | 8283 | 121.6 |
| Sugar, brown packed | 25005 | 96.6 |
| Sugar, white granulated | 25006 | 88.2 |
| Egg, whole raw | 19500 | 57 |
| Water, tap | 20041 | 3.7 |
| Flavor, *vanilla* extract | 26624 | 1.6 |
| Baking chips, real chocolate | 23313 | 134.6 |
| Root Chicory Flour | NA | 143.8 |

Flour content reduced by 69%. Root chicory flour is 20% of the total dough mass.

TABLE 4

Flour and Sugar Substitution

| Item | ESHA Code | Mass Added (grams) |
| --- | --- | --- |
| Flour, AP, bleached, enriched | 38030 | 136.1 |
| Baking Soda | 28003 | 3.5 |

TABLE 4-continued

Flour and Sugar Substitution

| Item | ESHA Code | Mass Added (grams) |
| --- | --- | --- |
| Salt, table | 26014 | 4.5 |
| Shortening | 8283 | 121.6 |
| Sugar, brown packed | 25005 | 60.1 |
| Sugar, white granulated | 25006 | 52.3 |
| Egg, whole raw | 19500 | 57 |
| Water, tap | 20041 | 3.7 |
| Flavor, *vanilla* extract | 26624 | 1.6 |
| Baking chips, real chocolate | 23313 | 134.6 |
| Root Chicory Flour | NA | 143.8 |

Sugar content reduced by 39% and flour content reduced by 35%. Root chicory flour is 20% of the total dough mass.

Example 2—Fructan Content of Chicory Flour

The fructan content of three chicory flours were analyzed at the Food Processing Center at the University of Nebraska-Lincoln. The chicory flour samples tested include the following Table 5.

TABLE 5

Sample labels, sample colors, and sample numbers.

| Label on bag | Color | Sample number |
| --- | --- | --- |
| 091114 #4 | Tan | 4 |
| 091014 #7 | Light brown | 7 |
| 091014 #3 | Brown | 3 |

The chicory flours were analyzed using AOAC Method 999.03, which involves removal of interfering sugars using an enzymatic/chemical process, followed by enzymatic degradation of fructan to its component sugars and colorimetric analysis of the sugars. The results are presented in Table 6.

TABLE 6

Fructan content of chicory flour samples. [a]

| Sample number | Mean | Standard deviation | LSD grouping [b] |
| --- | --- | --- | --- |
| 4 | 60.9 | 0.4 | A |
| 7 | 60.3 | 0.5 | A |
| 3 | 56.1 | 0.8 | B |

[a] Samples were analyzed in quadruplicate.
[b] LSD grouping indicates significant differences using Fisher's least significant different test; samples with different letters are significantly different ($p < 0.05$).

Example 3—Composition Analysis of Chicory Flour

The composition of a chicory flour sample (091114 #4) was analyzed at Medallion Labs using convention methods. The results are presented in Table 7.

TABLE 7

Composition analysis of a chicory flour sample.

| Assay Group | Test | Results | Method Reference |
| --- | --- | --- | --- |
| Carbohydrates | Carbohydrates | 85.1% | Determination through calculation |
| | Fructose | 0.165% | AOAC: 977.20 |
| | Glucose | Less than 0.1% | AOAC: 977.20 |
| | Sucrose | 2.44% | AOAC: 977.20 |

TABLE 7-continued

Composition analysis of a chicory flour sample.

| Assay Group | Test | Results | Method Reference |
|---|---|---|---|
| Maltose | Less than 0.1% | | AOAC: 977.20 |
| Lactose | Less than 0.1% | | AOAC: 977.20 |
| Total Sugars | 2.61% | | AOAC: 977.20 |
| Calories | Calories | 366 calories/100 g | Determination |
| | Calories from Fat | 31 calories/100 g | through calculation |
| Moisture by Forced Air Oven (130° C./1 hr) | Moisture | 6.378% | AOAC: 931.04* |
| Ash, Overnight | Ash | 3.614% | AOAC: 923.03 |
| Protein, by Dumas | Protein (6.25) | 3.70% | AOAC: 992.15; AACC: 46-30 |
| Dietary Fiber, Codex Definition with Modifications | Insoluble Fiber | 13.6% | AOAC: 2009.01 with Modifications |
| | Soluble Fiber | 66.0% | |
| | Total Dietary Fiber | 79.6% | |
| Fat | Total Fat | 1.17% | AOAC: 948.15, 922.06, 925.32, 950.54, 922.09* |

Example 4—Sesquiterpenoid Lactone Profile of Low Bitter Chicory Plant Material

The sesquiterpene lactone concentration in bitter and low bitter chicory plant material was determined by HPLC using the method of Price et al., *J. Sci. Food Agric.,* 53: 185-192 (1990). More specifically, 500 mg samples of each of the bitter Leroux flour described in U.S. patent publication No. 20040241304 which was prepared from taproots of chicory variety 'Orchies', and dried plant material made from low bitter 'Chrysolite' variety taproots, each having equivalent moisture contents, were extracted with methanol (50 ml) by boiling under reflux (1 h). Each sample was filtered and the methanol was removed in vacuo. The extracts were twice partitioned between water/chloroform (100 ml; 1:1 mixture by volume) and santonin (50 µg) added as an internal standard. The chloroform layer was separated, washed with water (10 ml), dried and evaporated. The residue was dissolved in 500 µl methanol/chloroform mixture (1:2 by volume) and analyzed directly to give a measure of the free sesquiterpene lactones. The water layers were combined, reduced in vacuo to 40 ml and applied to an XAD-2 bead column (10 g). The column was washed with water (40 ml) and the glycosylated compounds were eluted with methanol. The methanol extract was evaporated to dryness, redissolved in water (5 ml) and treated with cellulose (from *Aspergillus niger*) (50 mg) (Sigma Chemical Co.) at 40° C. for 2 h with stirring. Santonin (50 µg) was added to the hydrolysate and extracted with ethyl acetate (3×5 ml). The solvent was evaporated and made up to 500 µl, as before, for estimate of bound sesquiterpene lactones.

Samples were analyzed on a Spherisorb ODS 2 (5 µm) column (250×4.6 mm) monitored at 262 nm. The mobile phase was H2O/acetonitrile (90:10, by volume) chaining to 58:42 (by volume) linearly over 30 min at a flow rate of 1 ml per min. Peaks were identified by comparison of retention times and UV spectra (photodiode array detector) of authentic compounds and through examination of CI and EI mass spectra of fractions collected by preparative HPLC.

Table 8 shows the sesquiterpene lactone profile found in a bitter flour (red) made from bitter chicory taproots. The sesquiterpene lactone profile from bitter plant material was compared to the sesquiterpene lactone profile found in plant material taken from taproots of a low bitter chicory variety 'Chrysolite' (blue). Each of the bitter and low bitter plant material was extracted twice. The results shown in Table 8 are the sums of the free and conjugated forms for each SQL molecule shown in Table 8. The bitter plant material used in this study is a chicory flour made and sold by the company Leroux. The Leroux advertising materials direct purchasers to limit use of their flour to only 0.8% to 1.5% of total ingredients in human food. This is because the Leroux flour is very bitter. In contrast, the chicory flour of the present invention can comprise more than 30% of total ingredients because it is much less bitter than conventional chicory flour.

Figure 5:
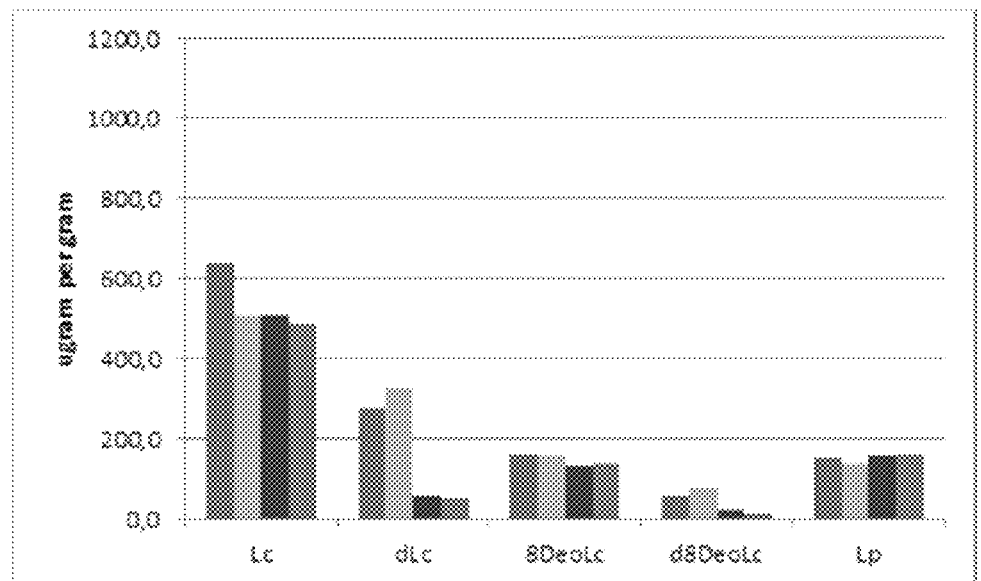
FIG. 5 is a table showing a Sesquiterpene Lactone Profile

Surprisingly, the low bitter plant material of the present invention has a significantly reduced amount of dihydrolactucin (dLc). The low bitter plant material of the present invention also has a reduced level of dihydro-8deoxy-lactucin (d8DeoLc). The low bitter plant material of the present invention did not have reduced levels of lactucin (Lc), 8-deoxylactucin (8DeoLc), or lactucopicrin (Lp). These results are surprising since all sesquiterpene lactone compounds shown in the sesquiterpene profile in Table 8 (FIG. 5) have been demonstrated to be bitter.

U.S. Patent Application Publication No. 2004/0241304 ("the '204 application") is entitled "Use of a Chicory Flour for Preparing a Food Dough" and describes manufacture and uses of a flour made from chicory taproots. The '204 application is assigned to Finaler, a holding company for the French company Leroux. The Leroux website describes manufacture of chicory flour by "grinding slices of chicory root after washing and dehyrating them." The '204 application does not describe a low bitter chicory flour or methods of making a low bitter flour. In fact, the Leroux website indicates that that only 0.8% to 1.5% of total flour weight can comprise the Leroux flour. As is shown in the below example, this low incorporation rate is a consequence of the bitter taste of the Leroux chicory flour. The Leroux chicory flour is made from the taproots of the bitter chicory variety 'Orchies.' In contrast, foods containing the chicory flour of the present invention can comprise 40% or more by total weight of ingredients because the chicory flour of the present invention is low bitter. The Leroux flour has about 300 µg dihydrolactucin per gram dry weight plant material while the flour made from "Chrysolite" by our methods has about 50 µg dihydrolactucin per gram dry weight plant material. The low bitter chicory flour of the present invention has 1, 5, 10, 20, 30, 40, 50, 60, 70, 80, 90 or more percent less dihydrolactucin than a bitter chicory flour. The low bitter chicory flour of the present invention has 0.5, 1, 2, 3, 4, 5, 6, 7. 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95 or more percent less dihydrolactucin than a bitter chicory flour.

The Leroux flour has about 50 µg dihydro-8deoxy-lactucin per gram dry weight plant material while the low bitter flour made from 'Chrysolite' by our methods has about 10 µg dihydro-8deoxy-lactucin per gram dry weight plant material. The low bitter chicory flour of the present invention has 1, 5, 10, 20, 30, 40, 50, 60, 70, 80, 90 or more percent less dihydro-8deoxy-lactucin than a bitter chicory flour. The low bitter chicory flour of the present invention has 0.5, 1, 2, 3, 4, 5, 6, 7. 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95 or more percent less dihydro-8deoxy-lactucin than a bitter chicory flour.

Example 5—Sensory Analysis

A sensory analysis was performed at the University of Nebraska Food Processing Center to compare butter cookies containing Leroux chicory flour and the low bitter chicory flour of the instant invention (designated in this Example as BPB) to a control lacking any chicory flour. The Leroux flour and the BPB flour each comprised 3% by weight of total ingredients in the cookie dough. The butter cookies were prepared as follows. The composition of the butter cookies is shown in Table 9.

Each of the cookie doughs containing control, Leroux and BPB flour were prepared separately in a heavy-duty mixer with paddle attachment. The butter, sugar, salt, and vanilla extract were made into a cream until light and smooth. The cream was mixed on medium for 2 minutes. The sides of the mixer were scraped down the sides for about 1 minute and after 2 minutes the egg yolks were added. Each time an egg yolk was added the dough it was mixed for 30 seconds to blend it thoroughly. The mixer was placed on low and flour was mixed into the dough for 1 minute. The side of the bowl was scraped at 30 seconds and 1 minute. Each of the control, Leroux and BPB flour doughs were divided into 4 equal pieces. Each piece was rolled into a log measuring about 1.5 inches in diameter.

Each log was individually wrapped in plastic wrap and refrigerated for at least 2 hours. About 30 minutes before baking, a shelf was placed in the center of the oven and the oven preheated to 375° F. A heavy baking sheet was covered with parchment sprayed with non-stick cooking spray. Cookies were formed by slicing the logs into 3/16-inch (0.4-cm) slices and arranged about 1 inch apart on sheet. The baking sheet was placed on a shelf. Each sheet was baked one at a time until the edges just began to brown or about 11 minutes. The cookies were allowed to cool on the sheet for 2 minutes and then removed to a cooling rack.

TABLE 9

Butter Cookie Formulas

| Ingredient | Measure | Control Weight | Control % | 3% BPB Weight | 3% BPB % | 3% LR Weight | 3% LR % |
| --- | --- | --- | --- | --- | --- | --- | --- |
| Unsalted Butter | 1 cup | 227 | 30.3273 | 227 | 30.3273 | 227 | 30.3273 |
| Sugar | 1 cup | 198 | 26.4529 | 198 | 26.4529 | 198 | 26.4529 |
| Salt | ½ tsp | 3 | 0.4008 | 3 | 0.4008 | 3 | 0.4008 |
| Vanilla Extract | ½ tsp | 2.5 | 0.334 | 2.5 | 0.334 | 2.5 | 0.334 |
| Egg Yolks | 2 lrg | 37 | 4.94322 | 37 | 4.94322 | 37 | 4.94322 |
| Bleached AP Flour | 2¼ cups | 281 | 37.5418 | 258.545 | 34.5418 | 258.545 | 34.5418 |
| BPB Chicory Flour | | | | 22.455 | 3 | 0 | 0 |
| Leroux Chicory Flour | | | | 0 | 0 | 22.455 | 3 |
| Total | | 748.5 | 100 | 748.5 | 100 | 748.5 | 100 |

The butter cookies in the Leroux, BPB and control groups were separately held in zipper bags at room temperature until testing. Samples consisted of a control cookie, a cookie with 3% BPB four and a cookie with 3% Leroux flour. The samples were placed on a 6 inch foam plate labeled with the sample's assigned three digit random number and covered with Saran wrap until they were served. Samples were served one at a time in a predetermined random order. Panelists were provided room temperature water and unsalted saltine crackers to clear their palate between samples. Data was collected using the SIMS 2000 computer system. A 15 point scale was used. A total of 53 people participated in the sensory analysis. All data are presented as Least Squares (L.S.) Means, which is an average that is weighted by the whole data set.

The attributes of the cookies tested were appearance, buttery taste, sweetness, off taste, overall taste acceptability, aftertaste off flavor, overall aftertaste acceptability, and overall sample acceptability.

All of the attributes tested were found to have significant differences at the P=5% level (P<0.05) with the exception of overall appearance and overall texture. In terms of overall after taste acceptability and overall sample acceptability, all of the samples were significantly different from each other. In these two attributes the control sample was rated the most desirable followed by the 3% Blue Prairie Sample and then finally by the 3% Leroux sample. In terms of overall flavor acceptability, the control and 3% BPB cookies were found to be more desirable than the 3% Leroux cookie. In terms of off flavor and after taste off flavor the 3% Leroux cookie was also found to have a more intense off flavor than the control or 3% BP cookies. The control and 3% Blue Prairie cookies were found to have a more intense sweet flavor than the 3% Leroux cookie. The control cookie and the 3% BPB cookie were found to have a more intense buttery flavor than the 3% Leroux cookie.

Table 10 shows the results from observations on appearance and texture attributes. At the P=5% level there was no significant difference observe in either appearance or texture attributes of coolies made with Leroux flour, BPB flour or control lacking any chicory flour.

TABLE 10

L.S. Means* for the Appearance and Texture Attributes of Butter Cookies

| Sample | Overall Appearance[1] | Overall Texture[1] |
|---|---|---|
| Control | 9.25 | 8.54 |
| 3% BPB | 9.18 | 9.25 |
| 3% Leroux | 8.58 | 9.21 |

*Means within an attribute (column) with a different letter are significantly different at P = 6%
[1]Where 0 = Very Undesirable and 15 = Very Desirable Table 11 shows the results from testing flavor attributes. All of the attributes showed significant differences between samples. The control cookies and the 3% BPB cookies were found to have a more intense buttery flavor than the 3% Leroux cookie. With regard to sweetness, off flavor, and overall flavor attributes the control and 3% BPB cookies were not found to be significantly different from each other but were significantly different from the 3% Leroux cookies. The control and 3% Blue Prairie cookies were found to have a more intense sweet flavor than the 3% Leroux cookie. The 3% Leroux cookie was also found to have a more intense off flavor than the control and 3% Blue Prairie cookies. In terms of overall flavor acceptability, the control and 3% Blue Prairie cookies were found to be more desirable than the 3% Leroux cookie.

TABLE 11

L.S. Means* for the Flavor Attributes of Butter Cookies

| Sample | Buttery[1] | Sweetness[1] | Off Flavor[1] | Overall Flavor Acceptability[2] |
|---|---|---|---|---|
| Control | 9.02a | 8.93a | 4.91a | 10.48a |
| 3% BPB | 8.90a | 8.44a | 5.44a | 9.54a |
| 3% Leroux | 7.85bc | 6.76b | 9.05b | 6.15b |

*Means within an attribute (column) with a different letter are significantly different at P = 5%
[1]Where 0 = Lacking and 15 = Intense
[2]Where 0 = Very Undesirable and 15 = Very Desirable Table 12 shows the results from observations take on aftertaste and the overall sample acceptability attributes of cookies containing BPB flour, Leroux flour and control containing now chicory flour. The 3% Leroux cookie was found to have a more intense aftertaste off flavor than the control and 3% BPB cookies. In terms of overall aftertaste acceptability and overall sample acceptability, the control sample was rated the most desirable followed by the 3% BPB cookies The 3% Leroux flour had a much lower overall aftertaste acceptability and overall sample acceptability compared to control and cookies containing 3% Leroux flour.

TABLE 12

L.S. Means* for the Aftertaste and Overall Acceptability Attributes of Butter Cookies

| Sample | Aftertaste Off Flavor[1] | Overall Aftertaste Acceptability[2] | Overall Sample Acceptability[2] |
|---|---|---|---|
| Control | 4.58a | 10.77a | 10.78a |
| 3% BPB | 4.89a | 9.76b | 9.63b |
| 3% Leroux | 8.89b | 5.30c | 6.15c |

*Means within an attribute (column) with a different letter are significantly different at P = 5%
[1]Where 0 = Lacking and 15 = Intense
[2]Where 0 = Very Undesirable and 15 = Very Desirable

Example 6—Chocolate Chip Cookie Recipe Made with Low Bitter Chicory Flour and Nutritional Analysis Ingredients: 1 cup butter, softened; 1 cup white sugar 1 cup packed brown sugar; 2 eggs; 2 teaspoons vanilla extract; 1½ cup low bitter chicory flour; 1½ cups all-purpose flour; 1 teaspoon baking soda; 2 teaspoons warm water; ½ teaspoon salt; 2 cups semisweet chocolate chips. Pan size: 18×26-inch sheet pan. Each portion: 1 20 g. cookies. Preheat oven to 350 degrees F. (175 degrees C.). Sift all-purpose flour, baking soda, and salt. Set aside. Cream the butter in mixer bowl, gradually add the white sugar and brown sugar until smooth. Mix at medium speed for about 3 minutes or until light and fluffy. Combine the eggs with the warm water and gradually add to the creamed mixture. Blend thoroughly about 1 minute, then stir in the vanilla. Mix thoroughly. Gradually add the chicory flour. Mix only until the ingredients are combined (about 1 minute), then add the flour, salt and baking soda mix, and mix to combine. Stir in the chocolate chips. Mix on low speed about 1 minute or until evenly distributed. Use #50 scoop to drop on parchment paper onto an ungreased pan, about 3 inches apart. Bake for about 9-11 minutes in the preheated oven at 375° F., or until edges are nicely browned. Allow to cool, then pack for freezing either in bulk or in individual bags. See FIG. 6 for nutrition facts.

Example 7—Chocolate Chip Cookie Dough Recipe Made with Low Bitter Chicory Flour and Nutritional Analysis Ingredients: 1 cup butter, softened; 1 cup white sugar 1 cup packed brown sugar; 2 eggs; 2 teaspoons vanilla extract; 1½ cup low bitter chicory flour; 1½ cups all-purpose flour; 1 teaspoon baking soda; 2 teaspoons warm water; ½ teaspoon salt; 2 cups semisweet chocolate chips.

Figure 7A:
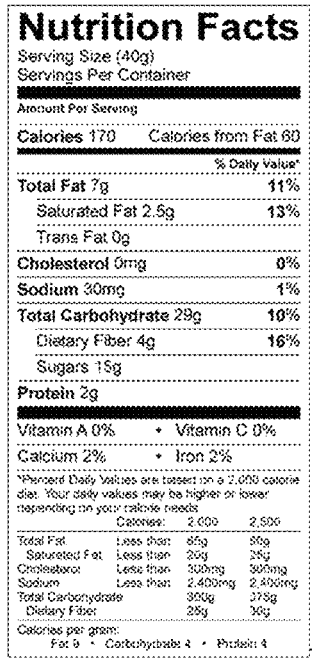
FIGS. 7A, 7B and 7C show the nutritional analysis for different serving sizes of chocolate chip cookie dough made with low bitter chicory flour according to recipe in Example 7.
Figure 7B:
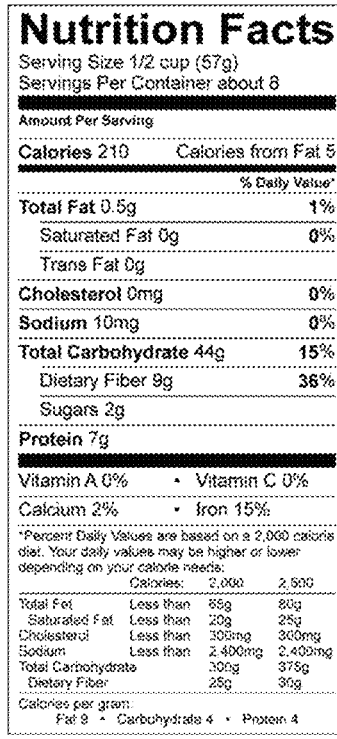
Figure 7C:
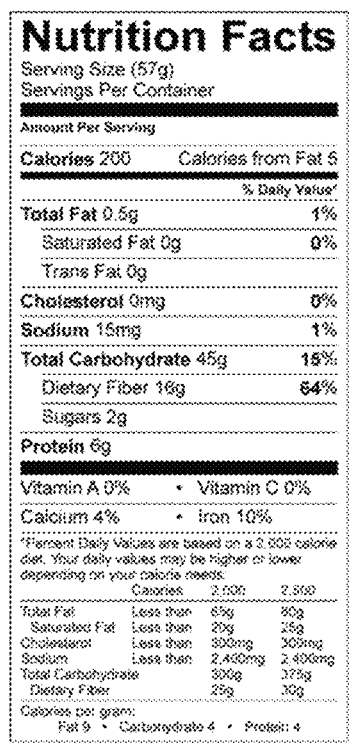

Sift all-purpose flour, baking soda, and salt. Set aside. Cream the butter in mixer bowl, gradually add the white sugar and brown sugar until smooth. Mix at medium speed for about 3 minutes or until light and fluffy. Combine the eggs with the warm water and gradually add to the creamed mixture. Blend thoroughly about 1 minute, then stir in the vanilla. Mix thoroughly. Gradually add the chicory flour. Mix only until the ingredients are combined (about 1 minute), then add the flour, salt and baking soda mix, and mix to combine. Stir in the chocolate chips. Mix on low speed about 1 minute or until evenly distributed. Fill dough into containers. Store containers in freezer at −4° C. to −20° C. See FIGS. 7A to 7B for nutrition facts.

Example 8—Brownie Mix Recipe Made with Low Bitter Chicory Flour and Nutritional Analysis Ingredients: 1 cup white sugar; ⅓ cup unsweetened cocoa powder; ¼ cup all-purpose flour; ¼ cup low bitter chicory flour; ¼ teaspoon salt; ¼ teaspoon baking powder; ⅓ cup oil; ¼ cup water; 2 eggs; 1 teaspoon vanilla.

Figure 8:
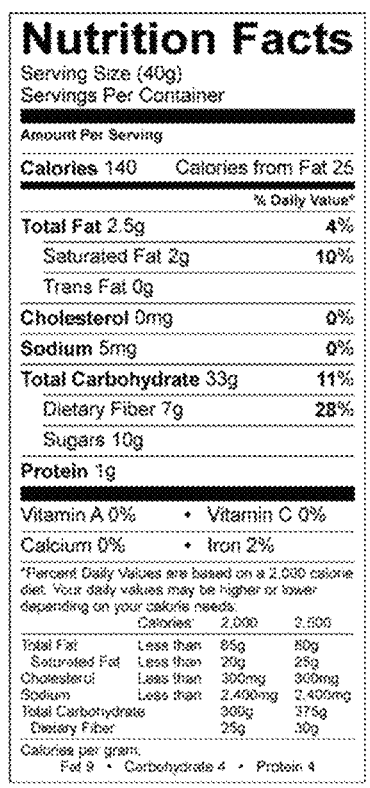
FIG. 8 shows the nutritional analysis for one serving size of Brownie Mix made with low bitter chicory flour according to recipe in Example 8.

Sift together all dry ingredients. In a medium bowl, beat the eggs with the vanilla. Add in and gently stir dry ingredients. Pour the oil and the water into brownie mixture and mix until just blended. Package in 350 gram packs for individual mixes for 8×8 pan of brownies and store in freezer. When ready to bake, pour batter into a greased 8×8 inch pan sprayed with PAM and bake in preheated oven at 350° F. for 25 minutes or until done in center. See FIG. 8 for nutrition facts.

Example 9—Pasta Recipe Made with Low Bitter Chicory Flour and Nutritional Analysis Ingredients: 1½ cup all-purpose flour; 1½ cup low bitter chicory flour; 1 cup water.

Mix all ingredients in pasta extruder; extrude into desired shape; dry in air for 30-60 minutes; cook in salted boiling water; drain and mix with desired sauce. See FIG. 9 for nutrition facts.

Example 10—Tortilla Recipe Made with Low Bitter Chicory Flour and Nutritional Analysis Ingredients: 2 cups all-purpose flour; 2 cups low bitter chicory flour; 1 teaspoon salt; 2 teaspoons baking powder; 2 tablespoons oil; 1½ cups lukewarm water.

Whisk the flour, salt, and baking powder together in a mixing bowl. Mix in the oil and the water until the dough comes together and change to dough hook. Knead/Mix for 5 minutes. Portion into 50 gram dough balls, cover and let sit for 5 to 10 minutes. Set Tortilla Press to 300° F. When pressing, place the dough ball in the center, and press until it whistles (usually 7-9 seconds). See FIG. 10 for nutrition facts.

Example 11—Soft Bread Stick Recipe Made with Low Bitter Chicory Flour and Nutritional Analysis Ingredients: 1½ cups all-purpose flour; 1½ cups low bitter chicory flour; 1 teaspoon salt; 2 teaspoons dry yeast powder; 1 teaspoon sugar; 4 tablespoons oil; 1½ cups lukewarm water.

Figure 11:
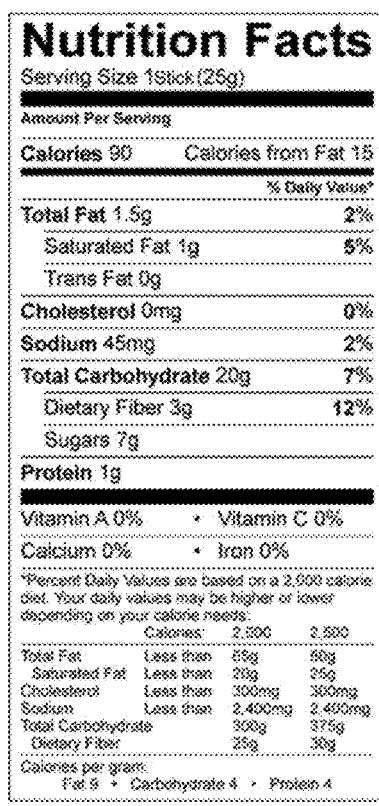
FIG. 11 shows the nutritional analysis of one soft bread stick made with low bitter chicory flour according to recipe in Example 11.

In large bowl dissolve yeast and sugar in water (110° F.) and let sit 5 minutes. Add oil and gradually add the all-purpose flour first and then the low bitter chicory flour. Knead for 5 minutes. Place dough into lightly oiled bowl with room to rise double and let sit for at least 1 hour at 110° F. After rise, punch down dough, divide in half, and using sheeter, sheet to 3 inches wide and 2.5 thick. Cut into 5 inch rectangles and roll into a stick. Place about ½ inch apart, lay with seam on the bottom, cover lightly with plastic wrap, then allow to raise for 30 minutes at 110° F. Bake in pre-heated oven at 400° F. for 12-15 minutes until just starting to brown. Brush with melted butter on tops and bottoms. See FIG. 11 for nutrition facts.

What is claimed is:

1. A low bitter chicory flour of a taproot of low bitter chicory plant of the variety 'Chrysolite' that does not have to be chemically processed to reduce bitterness, wherein said flour is less bitter than a flour made from the taproots of the chicory variety 'Orchies' as determined in taste test and wherein said chicory flour comprises from 10% to 90% less dihydrolactucin compared to a bitter chicory flour made from the taproots of *Chicorium intybus*.

2. The low bitter chicory flour according to claim 1, wherein said flour comprises from 10% to 90% less dihydro-8deoxy-lactucin compared to a bitter chicory flour made from the taproots of *Chicorium intybus*, and wherein said flour comprises no reduced levels of lactucin, 8-deoxylactucin and lactucopicrin compared to a bitter chicory flour made from the taproots of *Chicorium intybus*.

3. The low bitter chicory flour according to claim 2, wherein said flour comprises less than 10% by weight of sugar, less than 5% by weight of fat, between 10% and 20% by weight of insoluble fibers, between 50% and 75% by weight of soluble fibers, and between 2.5% and 10% by weight of protein.

4. A food product comprising at least 1.5% by weight of total ingredients of the low bitter chicory flour according to claim 1.

5. The food product according to claim 4, wherein the food product is one or more of dairy products, yoghurts, ice creams, milk-based drinks, milk-based garnishes, puddings, milkshakes, egg custard, cheeses, nutrition bars, energy bars, breakfast bars, confectionery, bakery products, crackers, cookies, biscuits, cereal chips, snack products, ice tea, fruit juice, diet drinks, sodas, sports drinks, powdered drink mixtures for dietary supplementation, infant and baby food, calcium-supplemented orange juice, bread, croissants, breakfast cereals, pasta, noodles, spreads, sugar-free biscuits and chocolates, calcium chews, meat products, mayonnaise, salad dressings, nut butter, sauces and soups.

6. The food product according to claim 4, wherein the food product comprises at least 5% of the low bitter chicory flour.

7. The food product according to claim 4, wherein the food product comprises at least 10% by weight of total ingredients of the low bitter chicory flour.

8. The food product according to claim 4, wherein the food product comprises at least 20% by weight of total ingredients of the low bitter chicory flour.

9. The food product according to claim 4, wherein the food product comprises at least 30% by weight of total ingredients of the low bitter chicory flour.

10. The food product according to claim 4, wherein the food product comprises at least 40% by weight of total ingredients of the low bitter chicory flour.

* * * * *